(12) United States Patent
Ouyang et al.

(10) Patent No.: US 12,045,155 B1
(45) Date of Patent: Jul. 23, 2024

(54) EFFICIENT MEMORY LEAK DETECTION IN DATABASE SYSTEMS

(71) Applicant: SAP SE, Walldorf (DE)

(72) Inventors: Yinghua Ouyang, Xi'an (CN); Zhen Tian, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/169,271

(22) Filed: Feb. 15, 2023

(51) Int. Cl.
*G06F 16/00* (2019.01)
*G06F 9/50* (2006.01)
*G06F 11/07* (2006.01)
*G06F 11/36* (2006.01)

(52) U.S. Cl.
CPC ........ *G06F 11/3636* (2013.01); *G06F 9/5016* (2013.01); *G06F 11/0751* (2013.01)

(58) Field of Classification Search
CPC . G06F 11/3636; G06F 11/0751; G06F 9/5016
See application file for complete search history.

(56) References Cited

U.S. PATENT DOCUMENTS

| | | | | |
|---|---|---|---|---|
| 6,658,652 B1 * | 12/2003 | Alexander, III | ...... | G06F 11/366 711/6 |
| 6,782,462 B2 * | 8/2004 | Marion | ............... | G06F 11/3466 711/170 |
| 9,558,055 B2 * | 1/2017 | Qin | ........................... | G06F 9/50 |
| 9,811,441 B2 * | 11/2017 | Santhanakrishnan | ........................ | G06F 11/3604 |
| 10,545,984 B2 | 1/2020 | Zhang et al. | | |
| 10,635,570 B2 * | 4/2020 | Gahlin | ................ | G06F 11/3466 |
| 11,061,927 B2 | 7/2021 | Ouyang et al. | | |
| 11,379,477 B2 | 7/2022 | Ouyang et al. | | |
| 11,423,024 B2 | 8/2022 | Ouyang et al. | | |

(Continued)

FOREIGN PATENT DOCUMENTS

CN 104750563 B * 11/2017
CN 107436845 A * 12/2017

(Continued)

OTHER PUBLICATIONS

U.S. Appl. No. 17/462,121, Ouyang, filed Aug. 31, 2021.

(Continued)

*Primary Examiner* — Cheng Yuan Tseng
(74) *Attorney, Agent, or Firm* — Fish & Richardson P.C.

(57) ABSTRACT

The present disclosure involves systems, software, and computer implemented methods for efficient memory leak detection in database systems. One example method includes receiving a query at a database system. Memory allocations and deallocations are traced during processing of the query. Each memory allocation entry in a tracing file can be processed, including determining, for each allocation, whether a memory deallocation entry exists in the tracing file. A determination can be made as to whether a memory leak has occurred in response to determining whether a memory deallocation entry corresponding to a memory allocation entry exists in the tracing file. For example, a determination can be made that a memory leak has occurred in response to determining that no memory deallocation entry corresponding to an allocated memory address exists in the tracing file. One or more actions can be performed in response to determining that a memory leak has occurred.

20 Claims, 6 Drawing Sheets

(56) References Cited

U.S. PATENT DOCUMENTS

| | | |
|---|---|---|
| 11,429,610 B2 | 8/2022 | Cheng et al. |
| 11,455,125 B2 * | 9/2022 | Mangione-Tran .... G06F 11/079 |
| 11,494,359 B2 | 11/2022 | Hao et al. |
| 2018/0107832 A1 | 4/2018 | Ouyang et al. |

FOREIGN PATENT DOCUMENTS

| | | | | |
|---|---|---|---|---|
| CN | 107066390 B | * | 1/2020 | .......... G06F 11/3644 |
| WO | WO-2009114985 A1 | * | 9/2009 | ............ G06F 11/073 |

OTHER PUBLICATIONS

U.S. Appl. No. 17/983,589, Ouyang et al., filed Nov. 9, 2022.
U.S. Appl. No. 17/985,294, Ouyang, filed Nov. 11, 2022.
Wikipedia.org [online], "Memory Leak" Jul. 2001, retrieved on Feb. 14, 2023, retrieved from URL <https://en.wikipedia.org/wiki/Memory_leak>, 7 pages.
Wikipedia.org [online], "Query Plan" Apr. 2005, retrieved on Feb. 14, 2023, retrieved from URL <https://en.wikipedia.org/wiki/Query_plan>, 3 pages.

\* cited by examiner

Trace File

| RowID | Type | Address | Timestamp | Phase | ThreadID | ConnID | Query String |
|---|---|---|---|---|---|---|---|
| 1 | Alloc | Address1 | Time1 | Parse | Thread1 | Conn1 | Query1 |
| 2 | Alloc | Address2 | Time2 | Pre | Thread2 | Conn1 | Query1 |
| 3 | Alloc | Address3 | Time3 | Plan | Thread3 | Conn1 | Query1 |
| 4 | Alloc | Address4 | Time4 | Opt | Thread4 | Conn1 | Query1 |
| 5 | Alloc | Address5 | Time5 | Parse | Thread5 | Conn2 | Query2 |
| 6 | Alloc | Address6 | Time6 | Pre | Thread6 | Conn2 | Query2 |
| 7 | Dealloc | Address1 | Time7 | Post | Thread7 | Conn1 | Query1 |
| 8 | Dealloc | Address2 | Time8 | Post | Thread8 | Conn1 | Query1 |
| 9 | Dealloc | Address4 | Time9 | Post | Thread9 | Conn1 | Query1 |
| 10 | Dealloc | Address6 | Time10 | Exception | Thread10 | Conn2 | Query2 |

FIG. 2B

Memory Leak Report

| RowID | Type | Address | Allocated | Phase | ThreadID | ConnID | Query String | Detected |
|---|---|---|---|---|---|---|---|---|
| 1 | Leak | Address3 | Time3 | Opt | Thread3 | Conn1 | Query1 | Time11 |
| 2 | Leak | Address5 | Time5 | Parse | Thread5 | Conn2 | Query2 | Time12 |

Columns labeled: 352, 354, 356, 358, 360, 362, 364, 366, 368

EFFICIENT MEMORY LEAK DETECTION IN DATABASE SYSTEMS

TECHNICAL FIELD

The present disclosure relates to computer-implemented methods, software, and systems for efficient memory leak detection in database systems.

BACKGROUND

Query execution in a database phase can involve different phases. For example, a preprocessing phase can be performed that can include syntax checking and query string adjustment. A query plan phase can include generation of an initial query plan for the query. A plan optimization phase can include optimization of the initial query plan.

SUMMARY

The present disclosure involves systems, software, and computer implemented methods for efficient memory leak detection in database systems. An example method includes: receiving, at a database system, a query comprising a query string; tracing, as memory allocation entries in a memory leak tracing file, memory allocations of memory addresses performed during processing of the query; tracing, as memory deallocation entries in the memory leak tracing file, memory deallocations of memory addresses performed during processing of the query; determining to analyze the memory leak tracing file; processing each memory allocation entry in the memory leak tracing file, wherein the processing of a respective memory allocation entry includes: determining whether a memory deallocation entry corresponding to the memory allocation entry exists in the memory leak tracing file; determining that a memory leak has not occurred for a memory address of the memory allocation entry in response to determining that a memory deallocation entry corresponding to the memory allocation entry exists in the memory leak tracing file; determining that a memory leak has occurred for the memory address of the memory allocation entry in response to determining that no memory deallocation entry corresponding to the memory allocation entry exists in the memory leak tracing file; and performing one or more actions in response to determining that at least one memory leak has occurred for at least one allocated memory address included in the memory leak tracing file.

Implementations may include one or more of the following features. Tracing memory allocations can include tracing memory allocations during parsing, pre-processing, query planning, and optimization processing phases of the processing of the query. Tracing memory allocations can include, for a respective memory allocation entry, recording the query string, a timestamp, an indication of the processing phase in which the memory allocation occurred, a thread identifier, and a connection identifier. Tracing memory deallocations can include tracing memory deallocations during query post-processing and exception handling. Performing one or more actions can include automatically making more memory available to the database system. Performing one or more actions can include generating a memory leak report and providing the memory leak report to at least one recipient. The memory leak report can include, for a respective memory leak, the query string, a timestamp, an indication of the processing phase in which the memory allocation occurred, a thread identifier, and a connection identifier. Determining that a memory deallocation entry corresponding to the memory allocation entry exists in the memory leak tracing file can include locating a memory deallocation entry that has a same memory address and a later timestamp than the memory allocation entry.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2B illustrates an example memory leak trace file.

FIG. 3B illustrates an example memory leak report.

DETAILED DESCRIPTION

Some computing applications or systems can utilize significant dynamic memory allocation and deallocation. For example, a DBMS (Database Management System) can be an in-memory, multi-threading system which is used for various processes that act on large amounts of data. Other database systems may not be in-memory systems but may still use substantial amounts of memory. The DBMS can be deployed and used by various customers. In some cases, a software bug or other issue may cause a memory leak for a customer. A memory leak can be, for example, a situation in which memory is allocated for use (e.g., by a thread) but then never subsequently deallocated, even after the thread has finished processing. A memory leak can thus result in memory that is not made available again to the system for use by other processes. In some cases, memory leaks can accumulate gradually and can be challenging to detect and troubleshoot. For example, developers may find it difficult to find reproducible scenarios to reproduce memory leaks for diagnosing memory leak causes to identify a root cause of a memory leak. For DBMS scenarios, for example, finding memory leaks that relate to generation and use of a parse tree can be particularly challenging. If developers are not certain of a memory leak cause, developers may have to resort to inefficient approaches such as estimating and analyzing possible causes, walking through source code, etc.

To better pinpoint memory leak causes, an improved solution for identifying memory leaks can be used. For example and as described in more detail below, the improved solution can include components for both memory leak tracing and memory leak analyzing. The improved solution can be used to quickly find and identify root causes of memory leaks and report identified memory leaks to responsible parties for quick resolution. Memory leak tracing can involve tracing each memory allocation and deallocation for each DBMS query. Tracing can be turned on for debugging and turned off otherwise to not affect DBMS performance. Memory leak analyzing can involve analyzing a memory leak tracing file to determine if any traced allocations do not have a corresponding deallocation.

Figure 1:
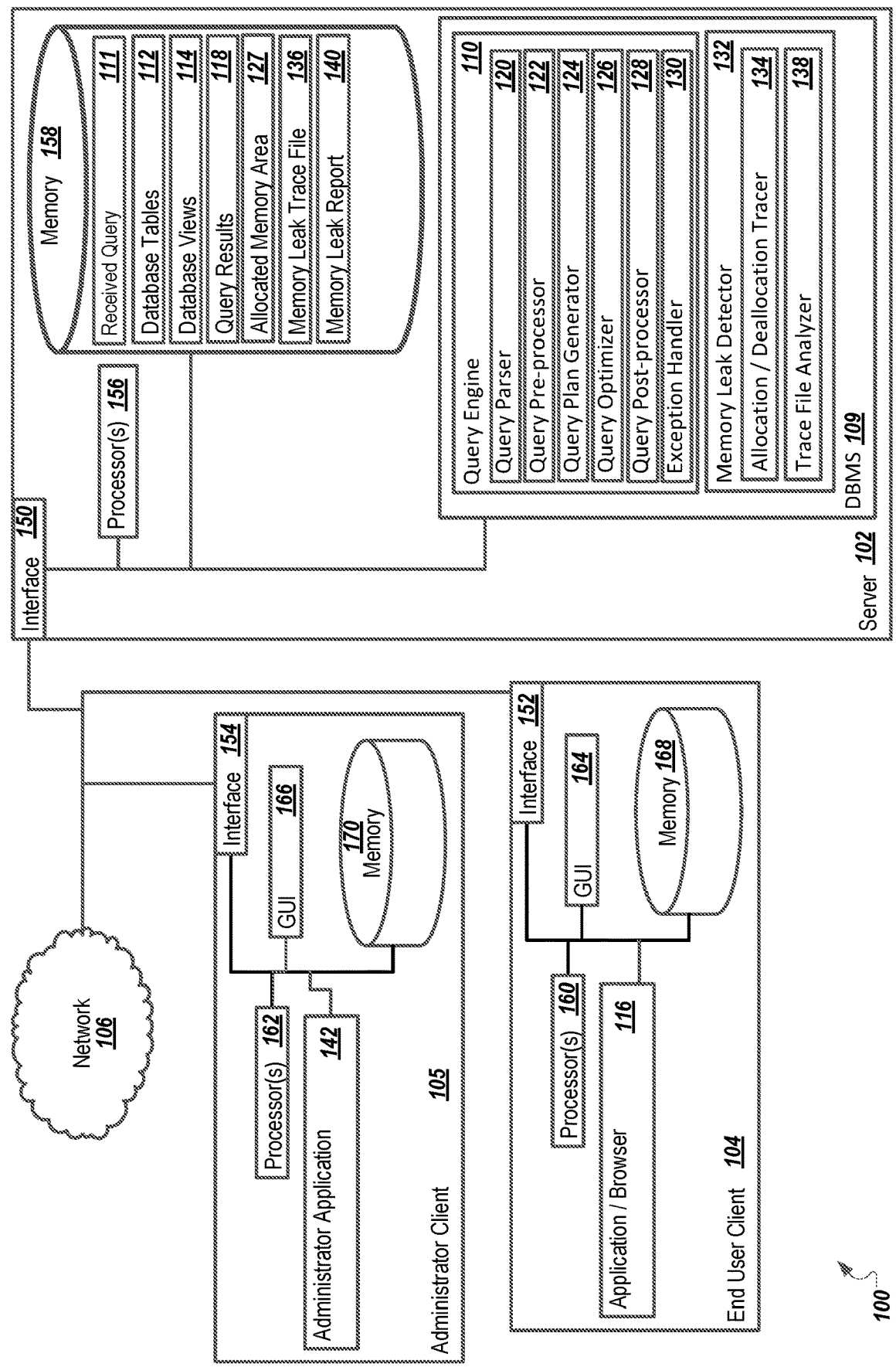
FIG. 1 is a block diagram illustrating an example system for efficient memory leak detection in database systems.

FIG. 1 is a block diagram illustrating an example system 100 for efficient memory leak detection in database systems. Specifically, the illustrated system 100 includes or is communicably coupled with a server 102, an end-user client device 104, an administrator client device 105, and a network 106. Although shown separately, in some implementations, functionality of two or more systems or servers may be provided by a single system or server. In some implementations, the functionality of one illustrated system, server, or component may be provided by multiple systems, servers, or components, respectively.

The server 102 (which may be a database server) includes a DBMS 109. The DBMS 109 includes a query engine 110. The query engine 110 can process a received query 111 against database artifacts such as database tables 112, database views 114, etc. The query engine 110 can process queries based on requests received from an application/browser 116, from internal server processes, or other types of requests. The query engine 110 can provide query results 118 to a requesting application or process.

The query engine 110 can perform various activities during query processing. For example, a query parser 120 can parse the received query 111, a query pre-processor 122 can perform pre-preprocessing activities, a query plan generator 124 can generate a query plan for the query, and a query optimizer 126 can optimize the query plan. During each of these phases, a corresponding component may allocate memory for use during a respective phase. For example, a memory allocation request may be made for a certain amount of memory and the server 102 may allocate the memory (e.g., as an allocated memory area 127) and return an allocated memory address in response to the memory allocation request.

Memory deallocation can occur at different times. For instance, memory deallocation can occur during activities performed by a query post-processor 128. As another example, memory deallocation may occur during exception handling activities performed by an exception handler 130. The exception handler 130 may be invoked if an exception occurs during query processing, for example. In some implementations, memory deallocation can occur at other points in time and by other components.

A memory leak detector 132 can be used to detect memory leaks during query processing. For example, a memory allocation/deallocation tracer 134 can trace each memory allocation and deallocation for each DBMS query, for example in a memory leak tracing file 136. As mentioned, tracing can be turned on for debugging and turned off otherwise to not affect performance of the DBMS 109. A trace file analyzer 138 can analyze the memory leak tracing file to determine if any traced allocations do not have a corresponding deallocation. Any memory leaks that are identified can be included by the trace file analyzer 138 in a memory leak report 140. The memory leak report 140 can be provided to the administrator client device 105, for example, for presentation in an administrator application 142. In some implementations, other actions may be automatically performed in response to memory leak detection. For example, additional memory may be automatically made available to the DBMS 109 in response to detected memory leak(s). Other automated actions can occur, such as automatically generating an alert message and sending the alert message to one or more parties or processes.

As used in the present disclosure, the term "computer" is intended to encompass any suitable processing device. For example, although FIG. 1 illustrates a single server 102, a single end-user client device 104, and a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, and 154 are used by the server 102, the end-user client device 104, and the administrator client device 105, respectively, for communicating with other systems in a distributed environment—including within the system 100—connected to the network 106. Generally, the interfaces 150, 152, and 154 each comprise logic encoded in software and/or hardware in a suitable combination and operable to communicate with the network 106. More specifically, the interfaces 150, 152, and 154 may each comprise software supporting one or more communication protocols associated with communications such that the network 106 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104 and the administrator client device 105 may each generally be any computing device operable to connect to or communicate with the server 102 via the network 106 using a wireline or wireless connection. In general, the end-user client device 104 and the administrator client device 105 each comprise an electronic computer device operable to receive, transmit, process, and store any appropriate data associated with the system 100 of FIG. 1. The end-user client device 104 and the administrator client device 105 can each include one or more client applications, including the application/browser 116 or the administrator application 142, respectively. A client application is any type of application that allows the end-user client device 104 or the administrator client device 105 to request and view content on a respective client device. In some implementations, a client application can use parameters, metadata, and other information received at launch to access a particular set of data from the server 102. In some instances, a client application may be an agent or client-side version of the one or more enterprise applications running on an enterprise server (not shown).

The end-user client device 104 and the administrator client device 105 respectively include processor(s) 160 or processor(s) 162. Each processor 160 or 162 included in the end-user client device 104 or the administrator client device 105 may be a central processing unit (CPU), an application specific integrated circuit (ASIC), a field-programmable gate array (FPGA), or another suitable component. Generally, each processor 160 or 162 included in the end-user client device 104 or the administrator client device 105 executes instructions and manipulates data to perform the operations of the end-user client device 104 or the administrator client device 105, respectively. Specifically, each processor 160 or 162 included in the end-user client device 104 or the administrator client device 105 executes the functionality required to send requests to the server 102 and to receive and process responses from the server 102.

The end-user client device 104 and the administrator client device 105 are each generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the respective client device itself, including digital data, visual information, or the GUI 164 or a GUI 166, respectively.

The GUIs 164 and 166 interface with at least a portion of the system 100 for any suitable purpose, including generating a visual representation of the application/browser 116 or the administrator application 142, respectively. In particular, the GUI 164 and/or the GUI 166 may be used to view and navigate various Web pages. Generally, the GUI 164 and the GUI 166 provide a respective user with an efficient and user-friendly presentation of business data provided by or communicated within the system. The GUI 164 and the GUI 166 may each comprise a plurality of customizable frames or views having interactive fields, pull-down lists, and buttons operated by the user. The GUI 164 and the GUI 166 each contemplate any suitable graphical user interface, such as a combination of a generic web browser, intelligent engine, and command line interface (CLI) that processes information and efficiently presents the results to the user visually.

Memory 168 and memory 170 included in the end-user client device 104 or the administrator client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memory 168 and the memory 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104 and/or administrator client devices 105 associated with, or external to, the system 100. For example, while the illustrated system 100 includes one end-user client device 104, alternative implementations of the system 100 may include multiple end-user client devices 104 communicably coupled to the server 102 and/or the network 106, or any other number suitable to the purposes of the system 100. Additionally, there may also be one or more additional end-user client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the end-user client device 104 and the administrator client device 105 may be described in terms of being used by a single user, this disclosure contemplates that many users may use one computer, or that one user may use multiple computers.

Figure 2A:
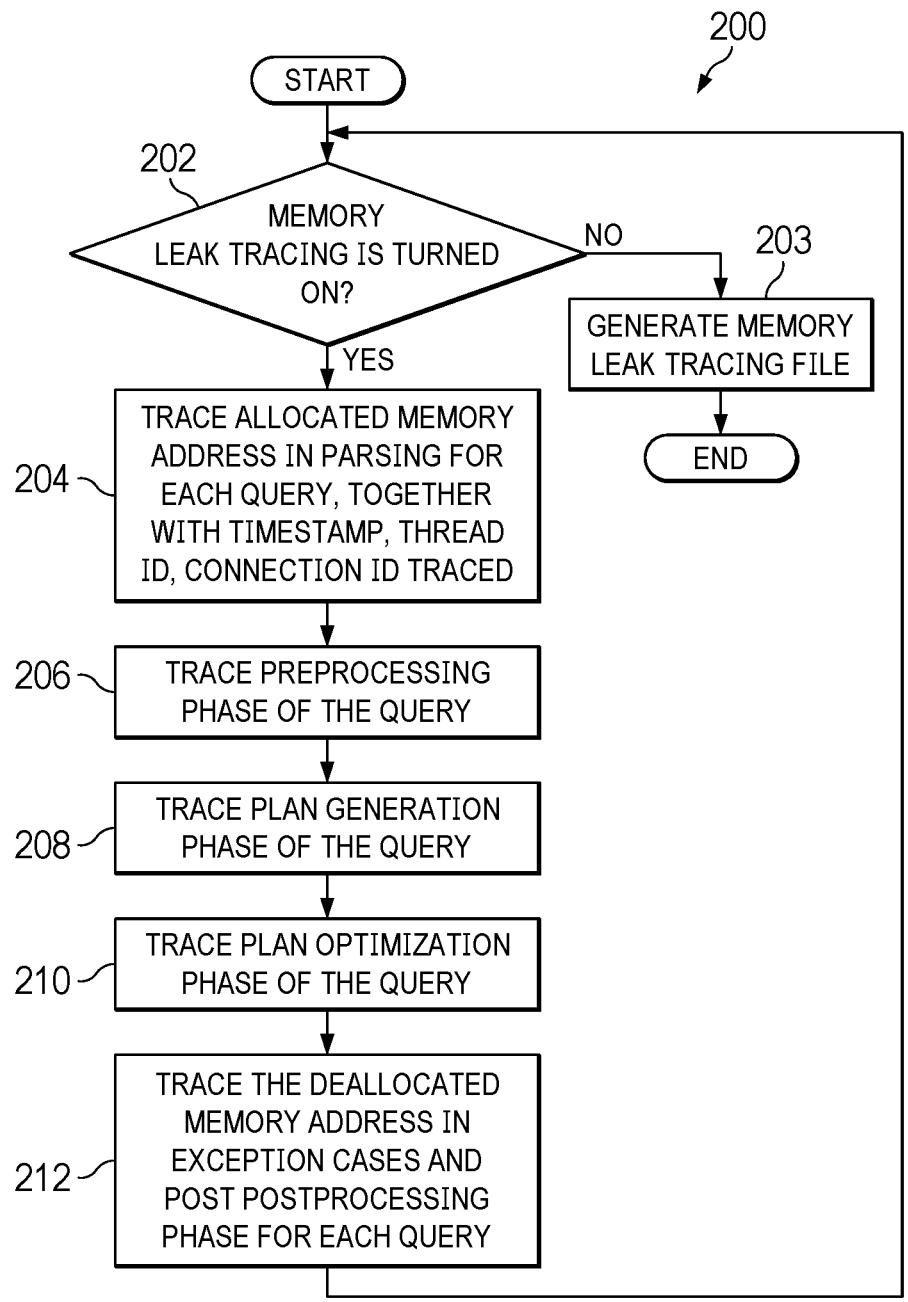
FIG. 2A is a flowchart of example process for generating a memory leak tracing file.

FIG. 2A is a flowchart of example process 200 for generating a memory leak tracing file. For example, the process 200 can be performed by the memory allocation/deallocation tracer 134 described above with respect to FIG. 1.

At 202, a determination is made as to whether memory leak tracing is turned on for a database system. Tracing can be performed while tracing is turned on. Once tracing is turned off, or in response to some other trigger, a memory leak tracing file can be generated.

At 204, if memory leak tracing is turned on for the database system, allocated memory addresses for queries are traced during a query parsing phase. For example, tracing can include recording the allocated memory address, a timestamp, a thread identifier, a connection identifier, and an indication of the parsing phase in which the memory allocation occurred. Other phases can include preprocessing, plan generation, and optimization, as described below in steps 206, 208, and 210.

At 206, memory allocation tracing is performed for a preprocessing phase of the query.

At 208, memory allocation tracing is performed for a plan generation phase of the query.

At 210, memory allocation tracing is performed for an optimization phase of the query. For each such tracing performed in steps 206, 208, and 210, the tracing can include recording the allocated memory address, a timestamp, a thread identifier, a connection identifier, and an indication of the phase in which the memory allocation occurred.

At 212, a deallocated memory address is traced in exception cases and/or in a post processing phase of the query. After memory allocations/deallocations are traced for a current query, the process 200 can return to step 202 to determine if tracing is still turned on (e.g., for other queries).

For example, steps 204, 206, 208, 210, and 212 can be performed for each query that is processed by the database system while memory leak tracing is turned on.

At 202, after processing is performed for one or more queries, a determination can be made at some point that memory leak tracing has been turned off. Accordingly, at 203, the memory leak tracing file can be generated. As another example, another trigger can be detected that corresponds to determining to generate a memory leak tracing file. For example, the memory leak tracing file can be generated periodically (e.g., every hour, every night), or in response to an explicit request to generate the memory leak tracing file.

FIG. 2B illustrates an example memory leak trace file 250. The memory leak trace file 250 can be generated by execution of the process 200 described above with respect to FIG. 2A. The memory leak trace file 250 includes entries (e.g., rows) that are identified by values in a row identifier column 252. For each row, an entry type value (e.g., allocation or deallocation) can be included in a type column 254. Memory addresses that are either recorded as being allocated or deallocated can be stored in an address column 256 and a timestamp of allocation or deallocation can be stored in a timestamp column 258. A phase column 260 can store a phase indication (e.g., parsing, pre-processing, planning, or optimization) of memory allocation or an indication of a phase (e.g., post-processing or exception handling) for deallocation. Thread identifier 262, connection identifier 264, and query string columns 266 can store relevant thread identifiers, connection identifiers, or query strings, respectively. The layout and structure of the memory leak tracing file 250 is one example of many types of implementations that may be used for tracing.

As shown by rows one through four of the memory leak trace file 250, Address1, Address2, Address3, and Address4 memory addresses were allocated during parsing, pre-processing, planning, and optimization phases of query processing of a Query1 query, respectively. Rows five and six indicate that Address5 and Address6 memory addresses were allocated during parsing and pre-preprocessing phases of query processing for a Query2 query, respectively.

Rows seven through nine indicate that the Address1, Address2, and Address4 memory addresses were deallocated during post-processing for the Query1 query, respectively. Note that the memory leak trace file 250 does not include a deallocation entry for the Address3 address. Row ten indicates that the Address6 address was deallocated during exception handling processing of the Query2 query. An exception may have occurred during the pre-processing phase, for example. Note that the memory leak trace file 250 does not include a deallocation entry for the Address5 address. The exception handling may have failed to deallocate a memory address allocated in a previous parsing phase, for example. The process 300 described below with respect to FIG. 3A can detect that deallocation entries are not included in the memory leak trace file 250 for the Address5 and Address3 addresses, for example.

Figure 3A:
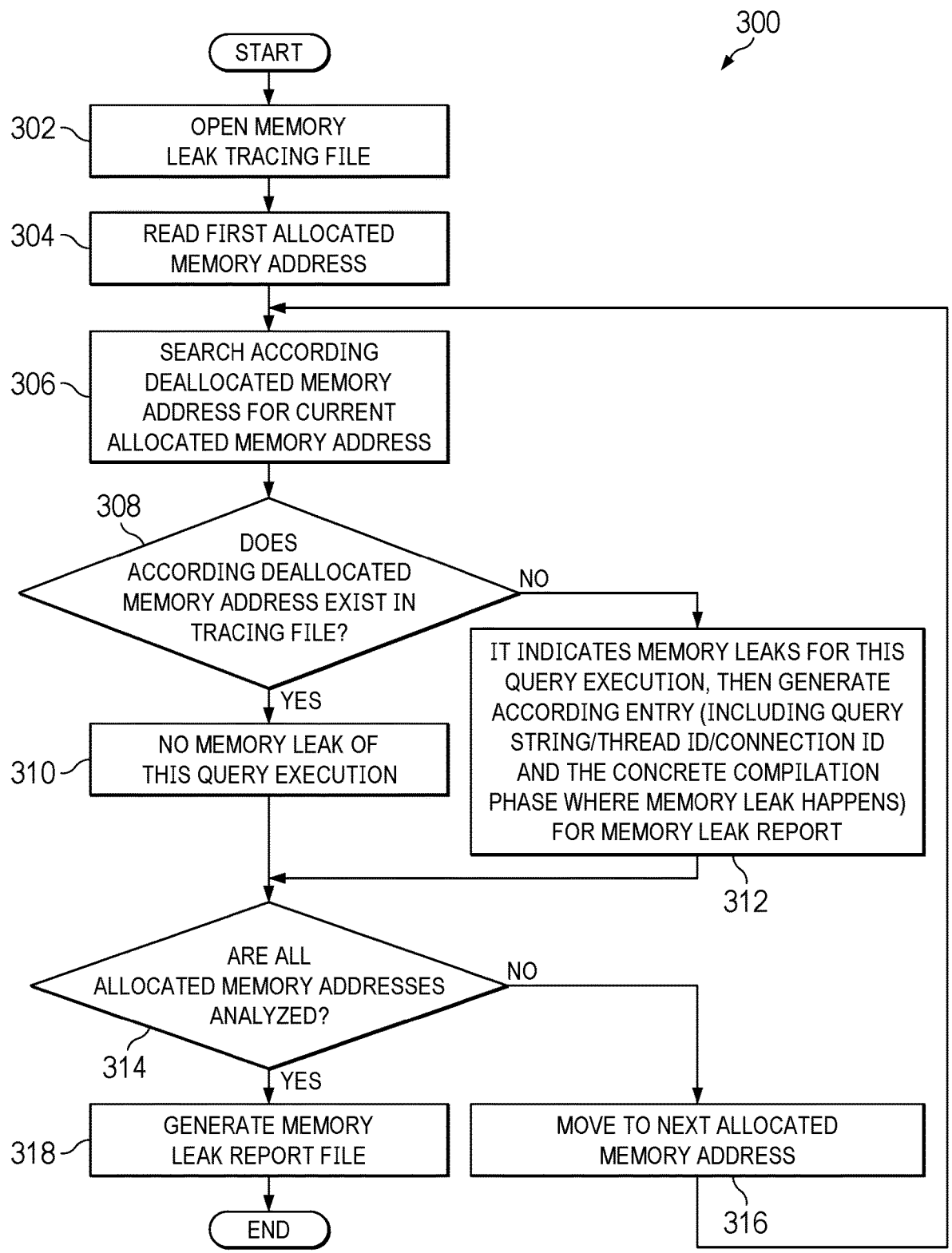
FIG. 3A is a flowchart of an example process for analyzing a memory leak tracing file.

FIG. 3A is a flowchart of an example process 300 for analyzing a memory leak tracing file. For example, the process 300 can be performed by the trace file analyzer 138 described above with respect to FIG. 1.

At 302, a memory leak tracing file is opened. For example, the memory leak tracing file can be opened in response to an administrator input to perform memory leak tracing analysis, a periodic trigger to perform analysis on a periodic interval (e.g., hourly, daily), or based on some other type of trigger.

At 304, a first allocated memory address is read from the memory leak tracing file as a current allocated memory address.

At 306, the memory leak tracing file is searched to attempt to locate the current allocated memory address in deallocated memory addresses in the memory leak tracing file.

At 308, a determination is made as to whether the current allocated memory address was found in deallocated memory addresses in the memory leak tracing file. In further detail, a determination can be made as to whether a deallocation entry with a later timestamp than a memory allocation entry for the current allocated memory address can be located.

At 310, in response to determining that the current allocated memory address was found in deallocated memory addresses in the memory leak tracing file, a determination is made that no memory leak occurred for the current allocated memory address for the query execution associated with the current allocated memory address.

At 312, in response to determining that the current allocated memory address was not found in deallocated memory addresses in the memory leak tracing file, an entry for the current allocated memory address is added to a memory leak report based on the current allocated memory address not being found in deallocated memory addresses in the memory leak tracing file indicating a memory leak for the query execution corresponding to the current allocated memory address. The entry in the memory leak report can include the current allocated memory address, a query string of the query, a thread identifier, a connection identifier, and an indication of the concrete compilation phase in which the memory leak happened.

At 314, a determination is made as to whether all allocated memory addresses in the memory leak tracing file have been analyzed.

At 316, if not all allocated memory addresses in the memory leak tracing file have been analyzed, a next allocated memory address is identified as the current allocated memory address and the next allocated memory address is processed in a similar manner as previously-analyzed allocated memory addresses, e.g., at steps 306, 308, 310, and 312.

At 318, if all allocated memory addresses in the memory leak tracing file have been analyzed, a memory leak report file is generated.

FIG. 3B illustrates an example memory leak report 350. The memory leak report 350 can be generated by execution of the process 300 described above with respect to FIG. 3A. The memory leak report 350 includes entries (e.g., rows) that are identified by values in a row identifier column 352. In some implementations, for each row, an entry type value (e.g., leak) can be included in a type column 354. The memory leak report 350 can include entries for memory addresses (e.g., as shown in an address column 356) which were allocated (e.g., as shown in an allocated column 358) but which were never deallocated (e.g., as determined by analyzing a trace file). For example, analyzing the memory leak trace file 250 can include detecting that the Address3 and Address5 addresses were allocated but never deallocated. The memory leak report 350 can include, for each entry, a phase indication 360, a thread identifier 362, a connection identifier 364, a query string 366, and a memory leak detection timestamp 368. The layout and structure of the memory leak report 350 is one example of many types of reports that may be generated.

Figure 4:
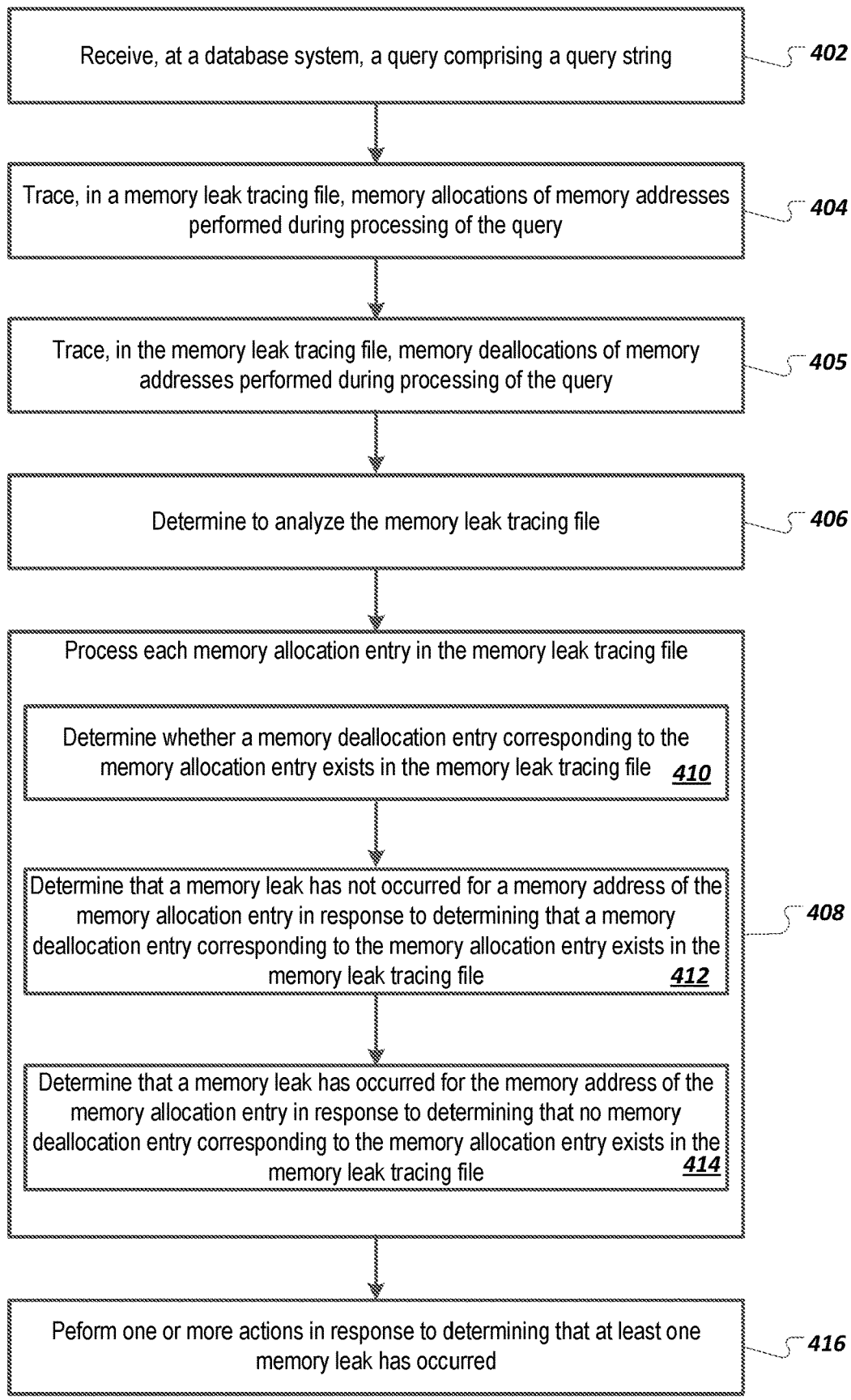
FIG. 4 is a flowchart of an example method for efficient memory leak detection in database systems.

FIG. 4 is a flowchart of an example method for efficient memory leak detection in database systems. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the memory leak detector 132 of FIG. 1.

At 402, a query comprising a query string is received at a database system.

At 404, memory allocations of memory addresses performed during processing of the query are traced as memory allocation entries in a memory leak tracing file. Tracing memory allocations can include tracing memory allocations during parsing, pre-processing, query planning, and optimization processing phases of the processing of the query. Tracing can include, for a respective memory allocation entry, recording the query string, a timestamp, an indication of the processing phase in which the memory allocation occurred, a thread identifier, and a connection identifier.

At 405, memory deallocations of memory addresses performed during processing of the query are traced as memory deallocation entries in the memory leak tracing file. Tracing memory deallocations can include tracing memory deallocations during query post-processing and exception handling.

At 406, a determination is made to analyze the memory leak tracing file.

At 408, each memory allocation entry in the memory leak tracing file is processed. Processing of a respective memory allocation entry can include different steps.

For example, at 410, a determination is made as to whether a memory deallocation entry corresponding to the memory allocation entry exists in the memory leak tracing file.

At 412, in response to determining that a memory deallocation entry corresponding to the memory allocation entry exists in the memory leak tracing file, a determination is made that a memory leak has not occurred for a memory address of the memory allocation entry.

At 414, in response to determining that no memory deallocation entry corresponding to the memory allocation entry exists in the memory leak tracing file, a determination is made that a memory leak has occurred for the memory address of the memory allocation entry.

At 416, one or more actions are performed in response to determining that at least one memory leak has occurred for at least one allocated memory address included in the memory leak tracing file. Performing one or more actions can include automatically making more memory available to the database system or generating a memory leak report and providing the memory leak report to at least one recipient. The memory leak report can include, for a respective memory leak, the query string, a timestamp, an indication of the processing phase in which the memory allocation occurred, a thread identifier, and a connection identifier.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving, at a database system, a query comprising a query string;
tracing, as memory allocation entries in a memory leak tracing file, memory allocations of memory addresses performed during processing of the query;
tracing, as memory deallocation entries in the memory leak tracing file, memory deallocations of memory addresses performed during processing of the query;
determining to analyze the memory leak tracing file;
processing each memory allocation entry in the memory leak tracing file, wherein the processing of a respective memory allocation entry includes:
determining whether a memory deallocation entry corresponding to the memory allocation entry exists in the memory leak tracing file;
determining that a memory leak has not occurred for a memory address of the memory allocation entry in response to determining that a memory deallocation entry corresponding to the memory allocation entry exists in the memory leak tracing file;
determining that a memory leak has occurred for the memory address of the memory allocation entry in response to determining that no memory deallocation entry corresponding to the memory allocation entry exists in the memory leak tracing file; and
performing one or more actions in response to determining that at least one memory leak has occurred for at least one allocated memory address included in the memory leak tracing file.

2. The computer-implemented method of claim 1, wherein tracing memory allocations includes tracing memory allocations during parsing, pre-processing, query planning, and optimization processing phases of the processing of the query.

3. The computer-implemented method of claim 2, wherein tracing memory allocations includes, for a respective memory allocation entry, recording the query string, a timestamp, an indication of a processing phase in which the memory allocation occurred, a thread identifier, and a connection identifier.

4. The computer-implemented method of claim 1, wherein tracing memory deallocations includes tracing memory deallocations during query post-processing and exception handling.

5. The computer-implemented method of claim 1, wherein performing one or more actions includes automatically making more memory available to the database system.

6. The computer-implemented method of claim 1, wherein performing one or more actions includes:
generating a memory leak report; and
providing the memory leak report to at least one recipient.

7. The computer-implemented method of claim 6, wherein the memory leak report includes, for a respective memory leak, the query string, a timestamp, an indication of a processing phase in which the memory allocation occurred, a thread identifier, and a connection identifier.

8. The computer-implemented method of claim 1, wherein determining that a memory deallocation entry corresponding to the memory allocation entry exists in the memory leak tracing file comprises locating a memory deallocation entry that has a same memory address and a later timestamp than the memory allocation entry.

9. A system comprising:
one or more computers; and
a computer-readable medium coupled to the one or more computers having instructions stored thereon which, when executed by the one or more computers, cause the one or more computers to perform operations comprising:
  receiving, at a database system, a query comprising a query string;
  tracing, as memory allocation entries in a memory leak tracing file, memory allocations of memory addresses performed during processing of the query;
  tracing, as memory deallocation entries in the memory leak tracing file, memory deallocations of memory addresses performed during processing of the query;
  determining to analyze the memory leak tracing file;
  processing each memory allocation entry in the memory leak tracing file, wherein the processing of a respective memory allocation entry includes:
    determining whether a memory deallocation entry corresponding to the memory allocation entry exists in the memory leak tracing file;
    determining that a memory leak has not occurred for a memory address of the memory allocation entry in response to determining that a memory deallocation entry corresponding to the memory allocation entry exists in the memory leak tracing file;
    determining that a memory leak has occurred for the memory address of the memory allocation entry in response to determining that no memory deallocation entry corresponding to the memory allocation entry exists in the memory leak tracing file; and
  performing one or more actions in response to determining that at least one memory leak has occurred for at least one allocated memory address included in the memory leak tracing file.

10. The system of claim 9, wherein tracing memory allocations includes tracing memory allocations during parsing, pre-processing, query planning, and optimization processing phases of the processing of the query.

11. The system of claim 10, wherein tracing memory allocations includes, for a respective memory allocation entry, recording the query string, a timestamp, an indication of a processing phase in which the memory allocation occurred, a thread identifier, and a connection identifier.

12. The system of claim 9, wherein tracing memory deallocations includes tracing memory deallocations during query post-processing and exception handling.

13. The system of claim 9, wherein performing one or more actions includes automatically making more memory available to the database system.

14. The system of claim 9, wherein performing one or more actions includes:
generating a memory leak report; and
providing the memory leak report to at least one recipient.

15. A computer program product encoded on a non-transitory storage medium, the product comprising non-transitory, computer readable instructions for causing one or more processors to perform operations comprising:
  receiving, at a database system, a query comprising a query string;
  tracing, as memory allocation entries in a memory leak tracing file, memory allocations of memory addresses performed during processing of the query;
  tracing, as memory deallocation entries in the memory leak tracing file, memory deallocations of memory addresses performed during processing of the query;
  determining to analyze the memory leak tracing file;
  processing each memory allocation entry in the memory leak tracing file, wherein the processing of a respective memory allocation entry includes:
    determining whether a memory deallocation entry corresponding to the memory allocation entry exists in the memory leak tracing file;
    determining that a memory leak has not occurred for a memory address of the memory allocation entry in response to determining that a memory deallocation entry corresponding to the memory allocation entry exists in the memory leak tracing file;
    determining that a memory leak has occurred for the memory address of the memory allocation entry in response to determining that no memory deallocation entry corresponding to the memory allocation entry exists in the memory leak tracing file; and
  performing one or more actions in response to determining that at least one memory leak has occurred for at least one allocated memory address included in the memory leak tracing file.

16. The computer program product of claim 15, wherein tracing memory allocations includes tracing memory allocations during parsing, pre-processing, query planning, and optimization processing phases of the processing of the query.

17. The computer program product of claim 16, wherein tracing memory allocations includes, for a respective memory allocation entry, recording the query string, a timestamp, an indication of a processing phase in which the memory allocation occurred, a thread identifier, and a connection identifier.

18. The computer program product of claim 15, wherein tracing memory deallocations includes tracing memory deallocations during query post-processing and exception handling.

19. The computer program product of claim 15, wherein performing one or more actions includes automatically making more memory available to the database system.

20. The computer program product of claim 15, wherein performing one or more actions includes:
   generating a memory leak report; and
   providing the memory leak report to at least one recipient.

\* \* \* \* \*